(12) United States Patent
Edwards et al.

(10) Patent No.: US 6,268,899 B1
(45) Date of Patent: *Jul. 31, 2001

(54) IDENTIFICATION OF LENTICULAR MATERIAL CHARACTERISTICS IN LENTICULAR PRINTERS

(75) Inventors: James L. Edwards, Rochester; Roger A. Morton, Penfield, both of NY (US)

(73) Assignee: Eastman Kodak Company, Rochester, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/397,231

(22) Filed: Sep. 16, 1999

(51) Int. Cl.[7] ........................... G03B 27/32; G03B 17/00; G03B 13/22; G02B 27/22; B41J 2/385

(52) U.S. Cl. ..................... 355/22; 359/463; 396/532; 396/71; 396/91; 347/129

(58) Field of Search ............................ 355/22; 359/463; 396/532, 71, 91; 347/129

(56) References Cited

U.S. PATENT DOCUMENTS

| | | | |
|---|---|---|---|
| 5,697,006 | * | 12/1997 | Taguchi et al. ............... 396/330 |
| 5,850,580 | * | 12/1998 | Taguchi et al. ............... 359/463 |
| 5,959,718 | * | 9/1999 | Morton ........................... 355/22 |

* cited by examiner

Primary Examiner—Russell Adams
Assistant Examiner—Khaled Brown
(74) Attorney, Agent, or Firm—William F. Noval

(57) ABSTRACT

A lenticular imaging product comprising: a lenticular lens element having an array of lenticules; and means for encoding characteristics of the lenticular lens element for use in processing the lenticular lens element.

6 Claims, 3 Drawing Sheets

IDENTIFICATION OF LENTICULAR MATERIAL CHARACTERISTICS IN LENTICULAR PRINTERS

FIELD OF THE INVENTION

This invention relates in general to lenticular imaging and more particularly to means for identifying the characteristics of lenticular material used in lenticular image printers.

BACKGROUND OF THE INVENTION

Lenticular image products include a lenticular lens element through which an associated composite image is viewed. The lenticular lens element includes an array of parallel lenticules having cylindrical lenses. The associated composite image includes a number of images which have been decomposed into image strips which are interleaved. Under each lenticule is a set of image strips, one strip from each image, the number of adjacent sets being equal to the number of lenticules. Relative motion between the lenticular image product and a viewer can produce any one of several image effects, including depth imaging, dynamic imaging, flip imaging, etc., depending upon the content of the composite image.

The manufacture of high quality lenticular image products involves the selection of a number of key parameters. These parameters often depend on the desired application and include variables such as:

Lenticular pitch.

Image type.

Refractive index of the material to be printed.

Size of the image sheet to be printed.

Method of illuminating final image.

Focal point position.

For example, if the image is to be illuminated from behind, a transparency is required. If the image is to be illuminated from the front, a reflection image is required. Images may also be illuminated from both behind and in front requiring yet another image type. These changes also involve the selection of different image receiving layers for the imaging material.

Desired lenticular image viewing effect:

For images to produce a smooth sensation of depth, a larger number of unique views is required compared to those lenticular images producing the sensation of motion. This requirement may also require a change in lenticular pitch.

Viewing distance.

Number of image scan lines per unit pitch.

As a result of these requirements, a lenticular image printer has to be able to handle different types of material. Furthermore, these different types of material require different responses from the printer. For example, for a change in lenticular pitch, the printer has to adapt to the required scan line spacing and spot size as well as a possible change in thickness of the material. For a change in image receiving layer characteristics, the printer must change parameters which could include writing speed, image processing changes, such as peaking, color correction, energy profiles, and spot size, to mention a few. It is therefore desirable to ensure that the printer can adapt to the type of material on which it has to write. It is also desirable that there be a means of communicating to the printer the type of lenticular material being fed to it.

The following patents disclosing techniques for aligning lenticular lens elements which do not solve these problems.

U.S. Pat. No. 5,699,190, inventors Young et al., issued Dec. 16, 1997.

U.S. Pat. No. 5,822,038, inventors Slater et al., issued Oct. 13, 1998.

U.S. Pat. No. 5,835,194, inventor Morton, issued Nov. 10, 1998.

U.S. Pat. No. 5,373,335, inventor Street, issued Dec. 13, 1994.

U.S. Pat. No. 5,479,270, inventor Taylor, issued Dec. 26, 1995.

The following patents disclosing techniques for providing coded holes or other indicia to identify one or more conventional film characteristics do not solve these problems either.

U.S. Pat. No. 2,289,740, inventors Stuber et al., issued Jul. 19, 1942.

U.S. Pat. No. 4,437,742, inventor Taniguchi, issued March 20, 1984.

SUMMARY OF THE INVENTION

According to the present invention, there is provided a solution to the problems of the prior art.

According to a feature of the present invention, there is provided a lenticular imaging product comprising: a lenticular lens element having an array of lenticules; and means for encoding characteristics of the lenticular lens element for use in processing the lenticular lens element.

According to another feature of the present invention, there is provided a lenticular imaging system comprising: a lenticular lens element having an array of lenticules; means associated with the lenticular lens element for encoding characteristics of the lenticular lens element; and apparatus for processing the lenticular lens element as a function of the encoded characteristics.

ADVANTAGEOUS EFFECT OF THE INVENTION

The invention has the following advantages.

1. Equipment using the lenticular lens element are provided with information useful in processing the element. Such equipment includes a photographic printer for exposing and printing the lenticular lens element.

DETAILED DESCRIPTION OF THE INVENTION

Figure 1:
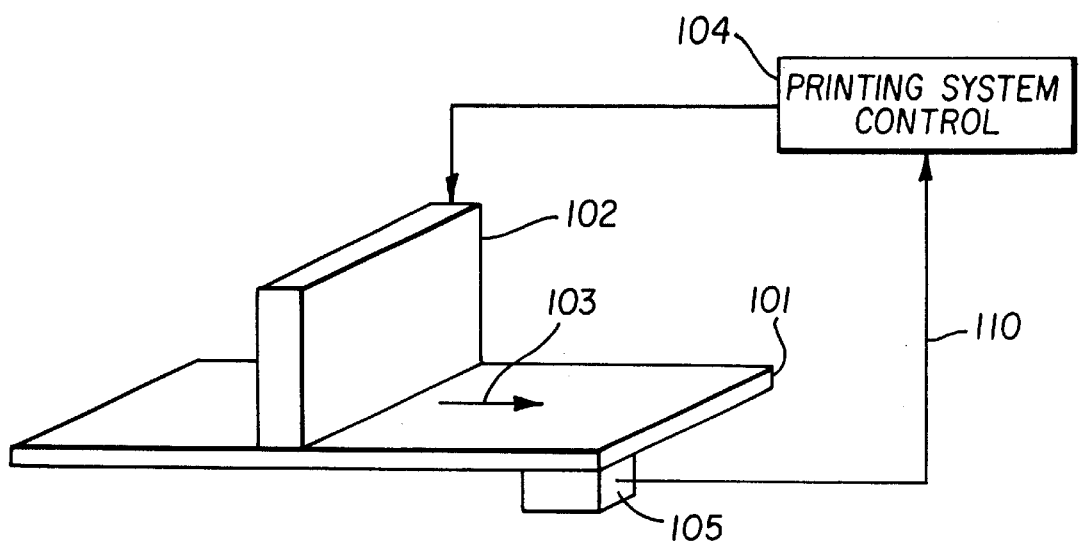
FIG. 1 is a perspective view of apparatus for processing a lenticular lens element according to the invention.

FIG. 1 shows an image substrate and image receiving layer combination 101 on which is to be placed an image. A scanning device 102 traverses the image substrate in direction 103.

The scanning device may be a laser scanner, cathode ray tube, thermal resistive head, printing press drum, an ink jet head or other device for applying energy or material, such as a dye, onto the substrate. In the case of applying energy onto the substrate, the printing process may be silver halide, thermal dye sublimation, thermal dye diffusion, thermal wax transfer, chemical dye diffusion, electrophotographic, or other image forming means. Other printing mechanisms may also be used.

The control of the printing device 102 is via a printing system control 104 that performs the image processing, frame storage, motion controls and supports other printing functions. Associated with the printing system control 104 is a device 105 which senses pre-existing identifying data which has been incorporated into the substrate and image receiving layer combination 101. The signals from this pre-existing identifying data are used to control both the line spacing position of the printing device head 102 and the processing of image information to the head 102 through the identifying information on line 110 which indicate the characteristics of the lenticular sheet 101. This identifying information can be in magnetic form or may be achieved by novel encoding means associated with the lenticular material. These means are shown in FIG. 2.

Figure 2:
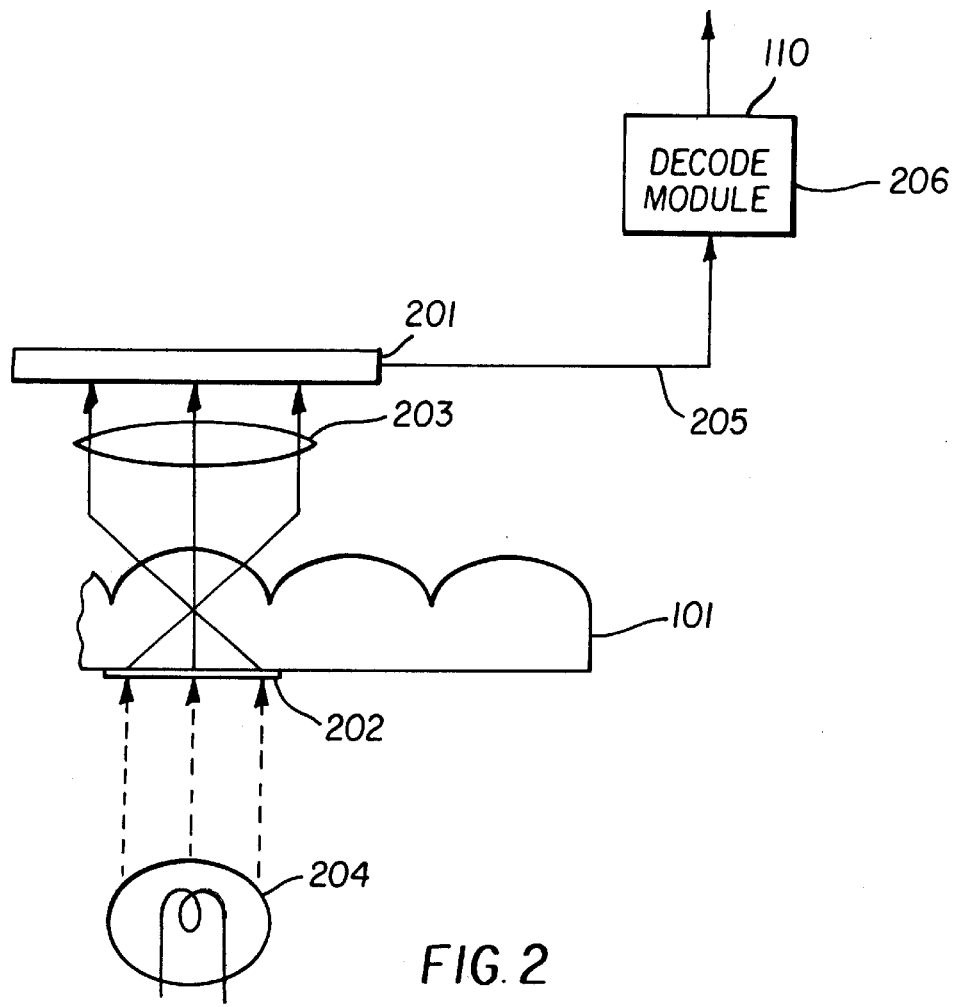
FIGS. 2–6 are diagrammatic views useful in explaining the present invention.

As shown in FIG. 2, an array scanner 201 senses an infrared pattern 202 which may be a bar code pattern, such as the UPC code or other binary code pattern which is affixed to the back of the lenticular sheet 101. A lens 203 compensates for the effect that the infrared dye in layer 202 may not be in focus in the lenticule, but causes through the lenticule for an accurate magnified reproduction of the infrared image to be imaged on sensor 201. Illumination of this assembly is through infrared source 204. The data from array sensor 201 passes on line 205 to decode module 206 to produce the identifying data on line 110 which passes to printing system control 104.

It will be appreciated that other marks, such as infrared or fluorescent dyes or inks, embossing marks, electrostatic signals, x-ray detectable signals, changes in resistively, elevation or other unique locating marks could be used.

It will be appreciated that the arrowheads on interconnecting lines, for example 110 and 204, indicate the primary, but not the exclusive flow of information along these interconnecting lines. Image information, for example such as acknowledgement signals, device status, information associated with servo loops inside the main servo loop, homing signals, synchronizing signals, clock signals and similar information may pass in the direction which is opposite or the same as the arrow shown. Thus, it will be appreciated that these arrowheads are included for the clarification and understanding in the mind of the reader so as to communicate the upper level system performance of the equipment rather than the detailed performance. This approach will be continued throughout this specification.

As already discussed, there are a variety of techniques for establishing the preexisting identifying marks. These include writing magnetic data on a magnetic layer which may be either on the image side or the backside of the substrate (by image side is meant the side of the substrate on which the image forming layers are placed). Some constructions may involve the use of additional layers to embed the image-forming layer within the imaging package. However, at the time the image is written, the image-forming layer is generally exposed with respect to the supporting substrate. In addition, pre-existing positional data or marks may be placed at some layer which is internal to the image package at the time the image is written or subsequent to when the image is written.

Other methods for forming the preexisting positional marks for referencing the image position along tracks include fluorescent dyes that may be caused to fluoresce in invisible or non-visible spectral frequencies using radiation which may also be visible or non-visible. A further method is to embed voids which may be detected ultrasonically, by optical means or by other means. Another method is to use embedded or surface charge which may be detected to provide positional information. In addition, the resistivity of either surface or bulk may be modified to establish reference marks.

A further method is by polarizing the surface or in bulk to provide detectable marks or to change the reflectivity or texture of the surface.

Another method is to place marks, such as yellow reference marks or some other color of mark which might be microscopic and therefore might not disturb the appearance of the image or by putting marks which are visible only to light which is outside of the sensitive spectrum of the media or by using marks which are outside the visible spectrum such as IR marks or UV marks or marks which are even further beyond the visible spectrum.

Another method is to place a visible image or other reference which during subsequent processing of the imaging material is removed.

A further method is to burn pits into the surface which pits may be optically detected, but may not be optically visible to the viewer.

A further method is to use a holographic optical layer within or on the surface of the image substrate or image receiver layer.

It is also possible to collectively apply layers of characteristic information using photographic and other methods which may be detected. These layers include thin metalization layers, oxide layers on a metalized substrate, oxide layers on material substrate and layers which exhibit other physical or chemical properties whose presence may be detected so as to determine the specific location and therefore constitute pre-existing positional data or a pre-existing positional mark.

Image data may also be used of itself to generate reference code; either by writing an IR layer or by using microstructure within the visible image but does not degrade the image when viewed by the observer.

It is also appreciated that any of the methods described herein as well as other methods could be placed in the image substrate, image receiver layer or at any other position within the material which is being written upon.

Alternatively, rather than have array sensors 201, a single position sensor may be used to generate pulses as the lenticular material 101 is moved past the assembly shown in FIG. 2.

Figure 3:
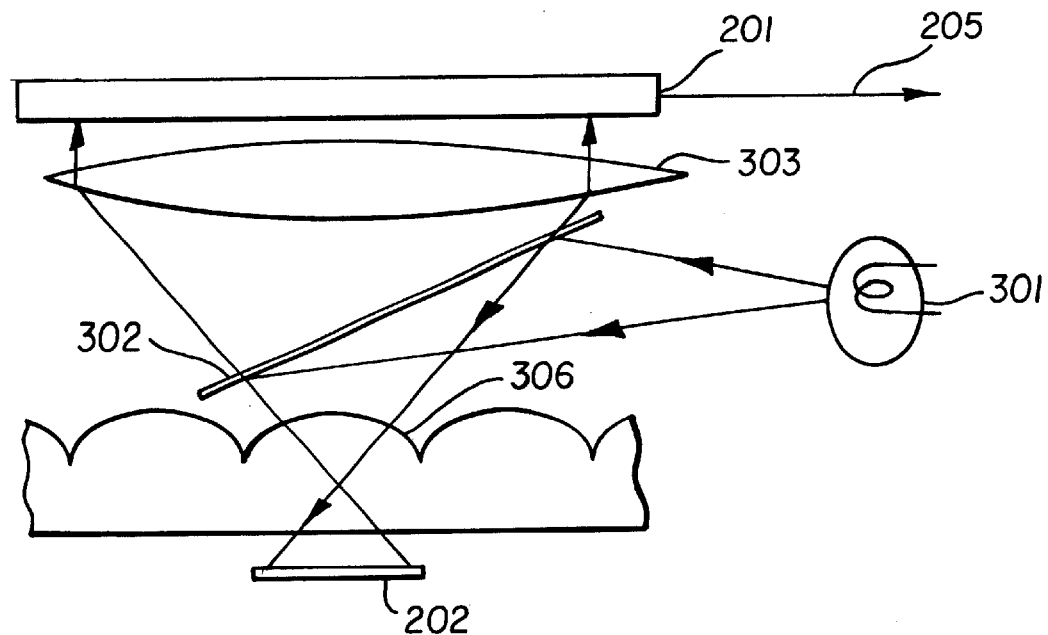
Figure 4:
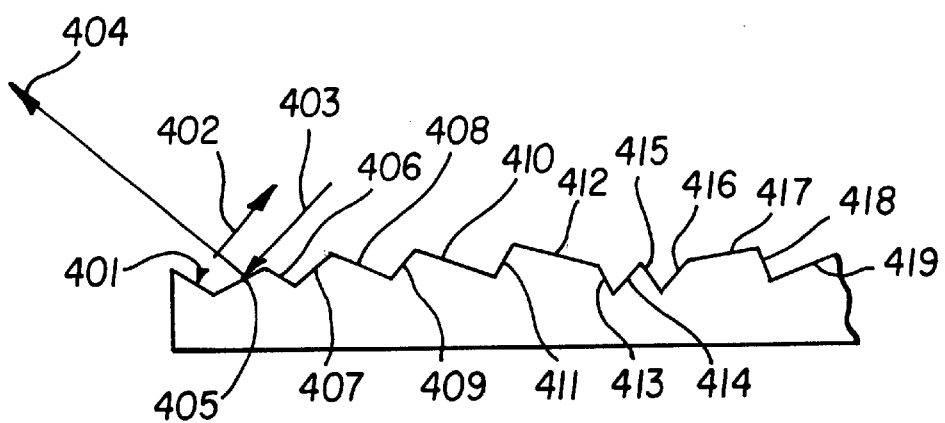

Alternatively, as shown in FIG. 3, in order to avoid the need for access to both sides of the lenticular material and therefore in order to simplify the design of the stage that supports the lenticular material, the lenticular material may be illuminated from the same side as the image is sensed. This is shown in FIG. 3. An IR light source 301 images through half-silvered mirror 302 and through lens 303 forms an image on array 201 whose signals pass on line 205 as shown in FIG. 2. The identification label 202 may be a specular profiled surface as shown in FIG. 4 in which surfaces such as surface segment 401 directly reflects illuminating light back to the lenticular material on ray 402 while causing illuminating light of ray 403 to be scattered in direction 404 from surface segment 405. Notice that the reflective segments 401, 406, 408, 410, 412, 417, and 419 produce light bars in the image of 201 whereas surface segments 405, 407, 409, 411, 413, 414, 415, 416, and 418 scatter light away from the return optic path through lenticule 306 and through adjacent lenticules at angles that fall outside of the collecting lens 303. Thus, these areas appear dark to the sensor 201 while the other areas appear light.

It will be appreciated that the techniques shown in FIGS. 2, 3, and 4 have the advantage that they need only subtend a small portion of one or two lenticules. By taking advantage of the magnifying capability of the lenticular lens, only a small area of the lenticular sheet is required.

Figure 5:
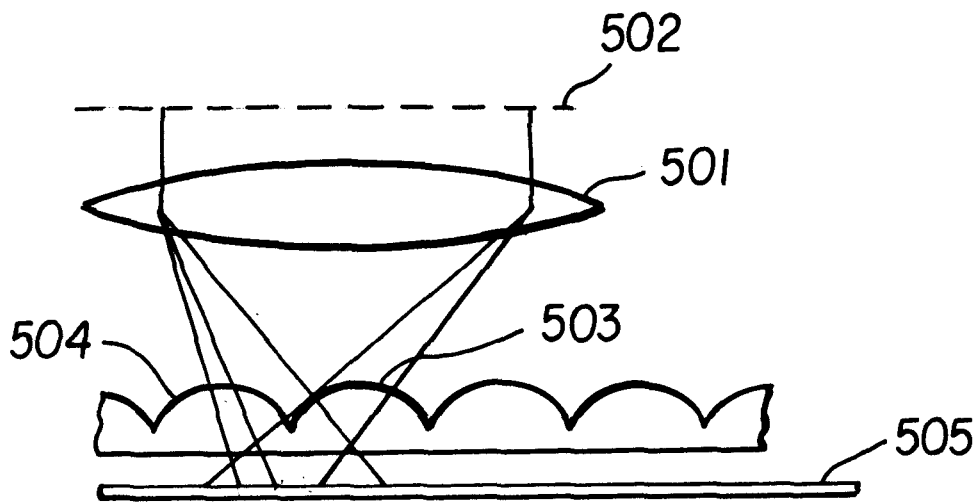

Another method for forming an identifying pattern is to expose a photographic emulsion 505 (as shown in FIG. 5). Lens 501 images bar pattern 502 through lenticular lenses 503 and 504 (as well as possibly other lenticular lenses) to cause almost identical patterns to be formed in the emulsion 505.

Figure 6:
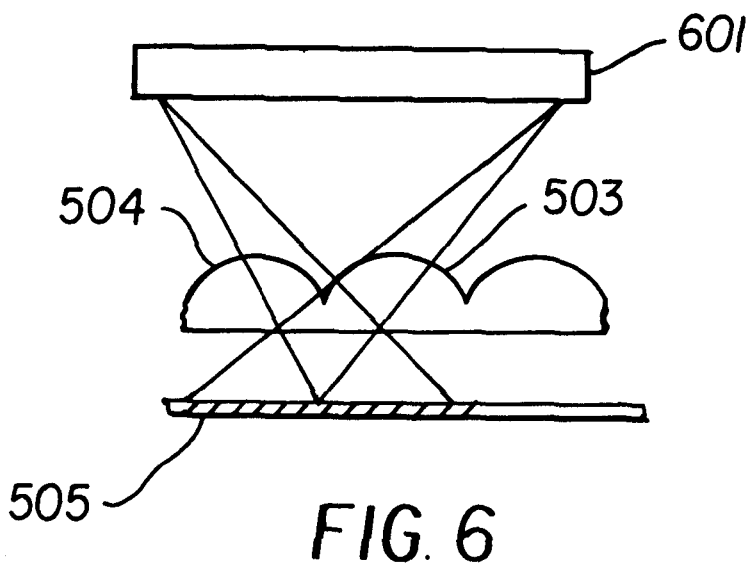

After processing, these patterns may then be imaged directly onto CCD sensor 601 (as shown in FIG. 6). This method requires local area photographic processing or can provide a confirmation of the material type used after processing the entire image.

The invention has been described in detail with particular reference to certain preferred embodiments thereof, but it will be understood that variations and modifications can be effected within the spirit and scope of the invention.

PARTS LIST

| | |
|---|---|
| 101 | image receiving layer combination |
| 102 | scanning device |
| 103 | direction |
| 104 | printing system control device |
| 105 | device |
| 110 | line |
| 201 | array scanner |
| 202 | infrared pattern |
| 203 | lens |
| 204 | infrared source |
| 205 | line |
| 206 | decode module |
| 301 | IR light source |
| 302 | half-silvered mirror |
| 303 | collecting lens |
| 306 | lenticule |
| 401 | surface segment |
| 402 | ray |
| 403 | ray |
| 404 | direction |
| 405 | surface segment |
| 401,406,408,410,412,417,419 | reflecting segments |

-continued

PARTS LIST

| | |
|---|---|
| 405,407,409,411,413,414,415,416,418 | surface segments |
| 501 | lens |
| 502 | bar pattern |
| 503,504 | lenticular lenses |
| 505 | photographic emulsion |
| 601 | CCD sensor |

What is claimed is:

1. A lenticular imaging product comprising:

a substrate having a first side with an array of lenticular lenses and a second opposite side having an image recording layer, and a bar code physically located on one of said first and second sides encoding one or more of the following characteristics, lenticular lens thickness, lenticular lens refractive index, lenticular lens pitch, lenticular lens dimension.

2. The lenticular imaging product of claim 1 wherein said bar code is located on a label attached to one of said first and second sides.

3. The lenticular imaging product of claim 1 wherein said bar code is printed directly on one of said first and second sides.

4. The lenticular imaging product of claim 1 wherein said bar code is physically incorporated into said substrate.

5. The lenticular imaging product of claim 1 wherein said bar code is recorded in said recording layer.

6. A lenticular imaging product comprising:

a substrate having a first side with an array of lenticular lenses and a second opposite side having an image recording layer; and a magnetic layer on one of said first and second sides having magnetically encoded thereon one or more of the following characteristics of the lenticular imaging product lenticular lens thickness, lenticular lens refractive index, lenticular lens pitch, lenticular lens dimension.

* * * * *